US012602057B2

(12) United States Patent
Chae et al.

(10) Patent No.: US 12,602,057 B2
(45) Date of Patent: Apr. 14, 2026

(54) ARTIFICIAL INTELLIGENCE CLEANER AND METHOD FOR OPERATING SAME

(71) Applicant: LG ELECTRONICS INC., Seoul (KR)

(72) Inventors: Jonghoon Chae, Seoul (KR); Jichan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

(21) Appl. No.: 18/715,363

(22) PCT Filed: Dec. 3, 2021

(86) PCT No.: PCT/KR2021/018231
§ 371 (c)(1),
(2) Date: May 31, 2024

(87) PCT Pub. No.: WO2023/101067
PCT Pub. Date: Jun. 8, 2023

(65) Prior Publication Data
US 2025/0036132 A1    Jan. 30, 2025

(51) Int. Cl.
G05D 1/246 (2024.01)
A47L 9/00 (2006.01)
(Continued)

(52) U.S. Cl.
CPC .............. G05D 1/246 (2024.01); A47L 9/009 (2013.01); A47L 9/2852 (2013.01);
(Continued)

(58) Field of Classification Search
CPC ...... G05D 1/246; G05D 1/6482; G05D 1/852; G05D 2101/15; G05D 2105/10;
(Continued)

(56) References Cited

U.S. PATENT DOCUMENTS

2010/0324773 A1* 12/2010 Choi .................... G05D 1/0272
901/1
2020/0178748 A1* 6/2020 Han ...................... G05D 1/0238
2021/0272434 A1* 9/2021 Hashimoto ............ G06V 20/10

FOREIGN PATENT DOCUMENTS

KR    10-2020-0069103 A    6/2020
KR    10-2020-0116187 A    10/2020

* cited by examiner

*Primary Examiner* — Ashley L Redhead, Jr.
(74) *Attorney, Agent, or Firm* — Birch, Stewart, Kolasch & Birch, LLP

(57) ABSTRACT

An embodiment of the present invention provides an artificial intelligence cleaner comprising: a memory for storing a simultaneous localization and mapping (SLAM) map of a cleaning space; a travel driving part for driving the artificial intelligence cleaner; and a processor for collecting a plurality of cleaning records for the cleaning space, dividing the cleaning space into a plurality of cleaning areas by using the SLAM map and the plurality of collected cleaning records, determining a cleaning path of the artificial intelligence cleaner in consideration of the divided cleaning areas, and controlling the travel driving part according to the determined cleaning path, wherein when an abnormal situation occurs during cleaning on the basis of the determined cleaning path, the processor modifies the cleaning path by applying path simplification to a preconfigured area of the remaining cleaning area.

7 Claims, 12 Drawing Sheets

100

(51) Int. Cl.

| | |
|---|---|
| *A47L 9/28* | (2006.01) |
| *G05D 1/648* | (2024.01) |
| *G05D 1/85* | (2024.01) |
| *G05D 101/15* | (2024.01) |
| *G05D 105/10* | (2024.01) |

(52) U.S. Cl.
CPC .......... *A47L 9/2884* (2013.01); *G05D 1/6482* (2024.01); *G05D 1/852* (2024.01); *A47L 2201/04* (2013.01); *G05D 2101/15* (2024.01); *G05D 2105/10* (2024.01)

(58) Field of Classification Search
CPC ........... G05D 2107/40; G05D 2109/10; G05D 1/644; G05D 1/43; G05D 1/617; A47L 9/009; A47L 9/2852; A47L 9/2884; A47L 2201/04; A47L 9/2805; A47L 9/2857; A47L 9/28; G06N 20/00
See application file for complete search history.

<u>100</u>

<u>200</u>

(a) meticulous mode                    (b) zigzag mode (c) intensive mode                     (d) designated area mode

FIG. 8

ARTIFICIAL INTELLIGENCE CLEANER AND METHOD FOR OPERATING SAME

CROSS REFERENCE TO RELATED APPLICATIONS

This application is the National Phase of PCT International Application No. PCT/KR2021/018231, filed on Dec. 3, 2021, which is hereby expressly incorporated by reference into the present application.

TECHNICAL FIELD

The present disclosure relates to an artificial intelligence cleaner and a method for operating the same, and more particularly to an artificial intelligence cleaner that modifies a cleaning path by performing path simplification when an abnormal situation occurs during cleaning.

BACKGROUND ART

A robot cleaner may refer to a device that automatically cleans a target area to be cleaned by suctioning foreign substances such as dust from a floor while autonomously traveling in the target area without user intervention. The robot cleaner may determine a cleaning path according to a built-in (or embedded) program and may perform cleaning operations while traveling along the determined cleaning path.

In general, the robot cleaner may consider only the environment within a preset radius (e.g., a radius of 25 cm) from the robot cleaner itself without considering the entire cleaning area, and at the same time may perform cleaning while avoiding obstacles present in the preset radius range. Therefore, the robot cleaner may perform a wandering motion each time it cleans areas it has previously wandered into, such as areas where a long cleaning time has been required to perform cleaning or areas where the robot cleaner has repeatedly collided with obstacles. For example, in a target area with many obstacles, there may occur an example case in which a long time is required to clean the target area or movement of the robot cleaner traveling in the target area is restricted and locked. Additionally, when cleaning a specific area, the robot cleaner may clean the specific area while moving many more times within the specific area than in other areas.

Therefore, if a cleaning path or a cleaning mode suitable for a given cleaning area can be set, the robot cleaner can more efficiently perform such cleaning.

DISCLOSURE

Technical Problem

The present disclosure aims to solve the above-described problems and other problems.

An object of the present disclosure is to provide an artificial intelligence cleaner that modifies (or changes) a cleaning path by simplifying the cleaning path when an abnormal situation occurs while cleaning a target area, and a method for operating the same.

An object of the present disclosure is to provide an artificial intelligence cleaner that identifies at least one candidate area in which path simplification is possible and modifies (or changes) a cleaning path by performing path simplification based on the importance of the at least one candidate area, and a method for operating the same.

Technical Solutions

In accordance with one aspect of the present disclosure, an artificial intelligence cleaner may include: a memory configured to store a simultaneous localization and mapping (SLAM) map of a cleaning space to be cleaned: a travel driver configured to drive the artificial intelligence cleaner; and a processor configured to determine a cleaning path of the artificial intelligence cleaner based on the SLAM map, and to control the travel driver according to the determined cleaning path, wherein, when an abnormal situation occurs during cleaning based on the determined cleaning path, the processor is configured to modify the cleaning path by applying path simplification to a preset area from among the remaining cleaning areas.

The processor may be configured to: identify at least one candidate area where path simplification is possible from among the remaining cleaning areas: determine a priority of the at least one candidate area; and determine the preset area based on the priority level.

The path simplification may be sequentially applied to the candidate areas arranged in ascending priority order such that the path simplification is first applied to a lowest-priority candidate area and is finally applied to a highest-priority candidate area.

The priority may be determined based on the number of vertices compared to a preset area based on the SLAM map.

The processor may be configured to predict a cleaning completion time compared to the remaining cleaning areas based on the modified cleaning path.

The processor may be configured to predict the cleaning completion time based on a reduced number of wheel rotations, after completion of the path simplification.

The abnormal situation may indicate a situation in which a remaining battery lifespan of the artificial intelligence cleaner is considered insufficient, wherein the processor is configured to calculate an insufficient operable time compared to the remaining cleaning areas based on the remaining battery lifespan.

The processor may be configured to: input the cleaning path, the SLAM map, and a cleaning history to an area segmentation model trained using a machine learning algorithm or a deep learning algorithm, and thus obtain map data as a result of the input; and modify the cleaning path using the obtained map data, wherein the trained area segmentation model includes an artificial neural network.

In accordance with another aspect of the present disclosure, a method for operating an artificial intelligence cleaner may include: collecting a plurality of cleaning histories for a cleaning space: dividing the cleaning space into a plurality of cleaning areas using a simultaneous localization and mapping (SLAM) map of the cleaning space and the plurality of collected cleaning histories: determining a cleaning path of the artificial intelligence cleaner in consideration of the divided cleaning areas: controlling a travel driver that drives the artificial intelligence cleaner according to the determined cleaning path; and when an abnormal situation occurs during cleaning based on the determined cleaning path, modifying the cleaning path by applying path simplification to a preset area from among the remaining cleaning areas.

In accordance with another aspect of the present disclosure, a recording medium storing a program required to perform a method of operating an artificial intelligence cleaner may include: performing the method of operating the artificial intelligence cleaner. The method of operating the artificial intelligence cleaner may include: collecting a plurality of cleaning histories for a cleaning space: dividing the cleaning space into a plurality of cleaning areas using a simultaneous localization and mapping (SLAM) map of the cleaning space and the plurality of collected cleaning histories: determining a cleaning path of the artificial intelligence cleaner in consideration of the divided cleaning areas: controlling a travel driver that drives the artificial intelligence cleaner according to the determined cleaning path; and when an abnormal situation occurs during cleaning based on the determined cleaning path, modifying the cleaning path by applying path simplification to a preset area from among the remaining cleaning areas.

Advantageous Effects

The effects of the artificial intelligence cleaner and the operation method of the artificial intelligence cleaner according to the embodiments of the present disclosure will be described as follows.

The artificial intelligence cleaner according to the embodiments of the present disclosure may intelligently adjust detailed cleaning paths according to abnormal situations while minimizing user intervention, and may thus increase usability and convenience of a user based on the result of such adjustment.

DESCRIPTION OF DRAWINGS

FIG. 8 is a conceptual diagram illustrating a method for simplifying a path of the artificial intelligence cleaner according to an embodiment of the present disclosure.

BEST MODE

Figure 1:
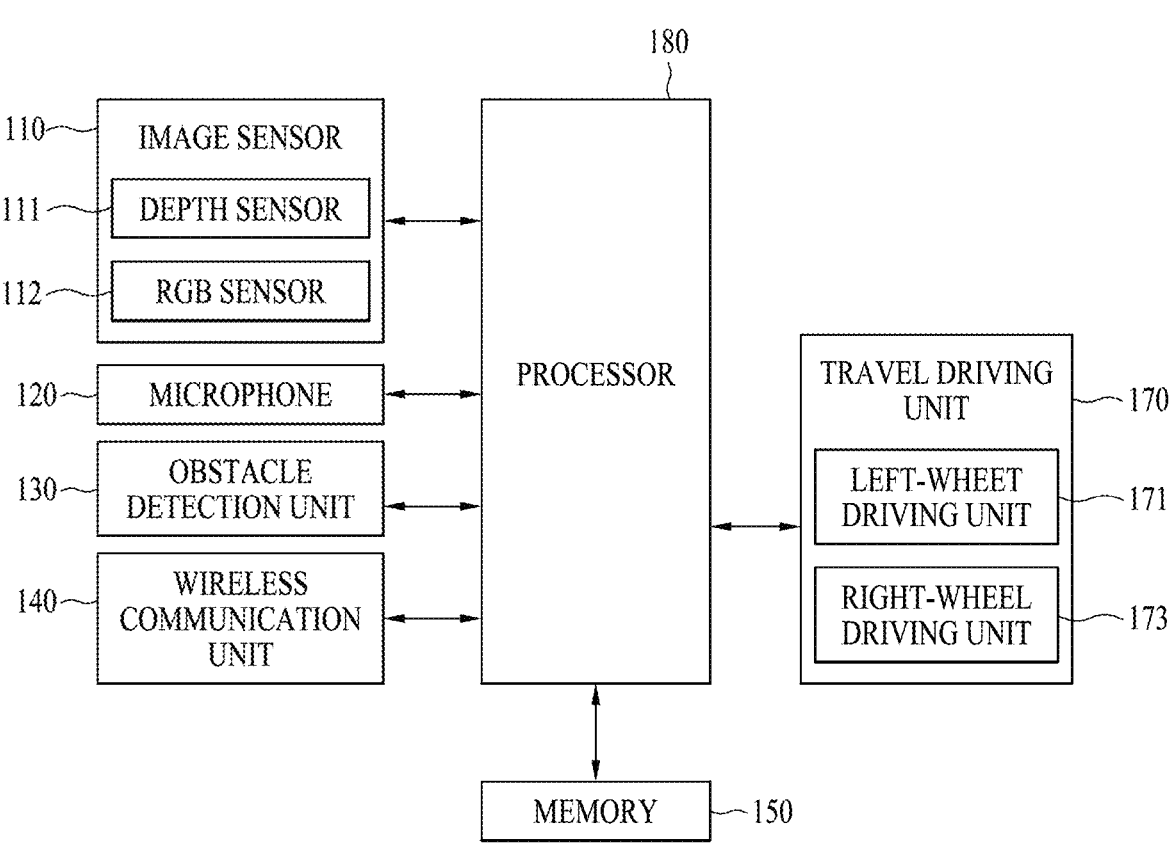
FIG. 1 is a block diagram illustrating a structure of an artificial intelligence cleaner according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the other element or intervening elements may also be present. In contrast, when an element is referred to as being "directly connected with" another element, there are no intervening elements present.

Artificial Intelligence (AI) refers to a field that studies artificial intelligence or methodology capable of achieving artificial intelligence. Machine learning refers to a field that defines various problems handled in the AI field and studies methodology for solving the problems.

In addition, AI does not exist on its own, but is rather directly or indirectly related to other fields in computer science. In recent years, there have been numerous attempts to introduce an AI element into various fields of information technology to use AI to solve problems in those fields.

Machine learning is an area of AI including the field of study that assigns the capability to learn to a computer without being explicitly programmed.

Specifically, machine learning may be a technology for researching and constructing a system for learning based on empirical data, performing prediction, and improving its own performance and researching and constructing an algorithm for the system. Algorithms of machine learning take a method of constructing a specific model in order to derive prediction or determination based on input data, rather than performing strictly defined static program instructions.

The term machine learning may be used interchangeably with the term machine learning.

Numerous machine learning algorithms have been developed in relation to how to classify data in machine learning. Representative examples of such machine learning algorithms include a decision tree, a Bayesian network, a support vector machine (SVM), and an artificial neural network (ANN).

The decision tree refers to an analysis method that plots decision rules on a tree-like graph to perform classification and prediction.

The Bayesian network is a model that represents the probabilistic relationship (conditional independence)

between a plurality of variables in a graph structure. The Bayesian network is suitable for data mining through unsupervised learning.

The SVM is a supervised learning model for pattern recognition and data analysis, mainly used in classification and regression analysis.

The ANN is a data processing system in which a plurality of neurons, referred to as nodes or processing elements, is interconnected in layers, as a model of the interconnection relationship between the operation principle of biological neurons and neurons.

The ANN is a model used in machine learning and includes a statistical learning algorithm inspired by a biological neural network (particularly, the brain in the central nervous system of an animal) in machine learning and cognitive science.

Specifically, the ANN may mean a model having a problem-solving ability by changing the strength of connection of synapses through learning at artificial neurons (nodes) forming a network by connecting synapses.

The term ANN may be used interchangeably with the term neural network.

The ANN may include a plurality of layers, each including a plurality of neurons. In addition, the ANN may include synapses connecting neurons.

The ANN may be generally defined by the following three factors: (1) a connection pattern between neurons of different layers: (2) a learning process that updates the weight of a connection; and (3) an activation function for generating an output value from a weighted sum of inputs received from a previous layer.

The ANN includes, without being limited to, network models such as a deep neural network (DNN), a recurrent neural network (RNN), a bidirectional recurrent deep neural network (BRDNN), a multilayer perceptron (MLP), and a convolutional neural network (CNN).

The term "layer" may be used interchangeably with the term "tier" in this specification.

The ANN is classified as a single-layer neural network or a multilayer neural network according to the number of layers.

A general single-layer neural network includes an input layer and an output layer.

In addition, a general multilayer neural network includes an input layer, one or more hidden layers, and an output layer.

The input layer is a layer that accepts external data. The number of neurons of the input layer is equal to the number of input variables. The hidden layer is disposed between the input layer and the output layer. The hidden layer receives a signal from the input layer and extract characteristics. The hidden layer transfers the characteristics to the output layer. The output layer receives a signal from the hidden layer and outputs an output value based on the received signal. Input signals of neurons are multiplied by respective strengths (weights) of connection and then are summed. If the sum is larger than a threshold of the neuron, the neuron is activated to output an output value obtained through an activation function.

The DNN including a plurality of hidden layers between an input layer and an output layer may be a representative ANN for implementing deep learning which is machine learning technology.

The present disclosure may employ the term "deep learning."

The ANN may be trained using training data. Herein, training may mean a process of determining parameters of the ANN using training data for the purpose of classifying, regressing, or clustering input data. Representative examples of the parameters of the ANN may include a weight assigned to a synapse or a bias applied to a neuron.

The ANN trained by the training data may classify or cluster input data according to the pattern of the input data.

Meanwhile, the ANN trained using the training data may be referred to as a trained model in the present specification.

Next, a learning method of the ANN will be described.

The learning method of the ANN may be broadly classified into supervised learning, unsupervised learning, semi-supervised learning, and reinforcement learning.

Supervised learning is a method of the machine learning for deriving one function from the training data.

Among derived functions, outputting consecutive values may be referred to as regression, and predicting and outputting a class of an input vector may be referred to as classification.

In supervised learning, the ANN is trained in a state in which a label for the training data has been given.

Here, the label may refer to a correct answer (or a result value) to be inferred by the ANN when the training data is input to the ANN.

Throughout the present specification, the correct answer (or result value) to be inferred by the ANN when the training data is input is referred to as a label or labeling data.

In the present specification, labeling the training data for training the ANN is referred to as labeling the training data with labeling data.

In this case, the training data and a label corresponding to the training data may configure one training set and may be input to the ANN in the form of the training set.

Meanwhile, the training data represents a plurality of features, and labeling the training data may mean labeling the feature represented by the training data. In this case, the training data may represent the feature of an input object in the form of a vector.

The ANN may derive a function of an association between the training data and the labeling data using the training data and the labeling data. Then, the ANN may determine (optimize) the parameter thereof by evaluating the derived function.

Unsupervised learning is a kind of machine learning in which the training data is not labeled.

Specifically, unsupervised learning may be a learning method that trains the ANN to discover and classify a pattern in the training data itself rather than the association between the training data and the label corresponding to the training data.

Examples of unsupervised learning may include, but are not limited to, clustering and independent component analysis.

The present disclosure may employ the term "clustering."

Examples of the ANN using unsupervised learning include, but are not limited to, a generative adversarial network (GAN) and an autoencoder (AE).

The GAN is a machine learning method of improving performance through competition between two different AI models, i.e., a generator and a discriminator.

In this case, the generator is a model for generating new data and may generate new data based on original data.

The discriminator is a model for discriminating the pattern of data and may serve to discriminate whether input data is original data or new data generated by the generator.

The generator may receive and learn data that has failed to deceive the discriminator, while the discriminator may receive deceiving data from the generator and learn the data.

Accordingly, the generator may evolve to maximally deceive the discriminator, while the discriminator may evolve to well discriminate between the original data and the data generated by the generator.

The AE is a neural network which aims to reproduce input itself as output.

The AE may include an input layer, at least one hidden layer, and an output layer.

Since the number of nodes of the hidden layer is smaller than the number of nodes of the input layer, the dimensionality of data is reduced and thus compression or encoding is performed.

Furthermore, data output from the hidden layer is input to the output layer. In this case, since the number of nodes of the output layer is greater than the number of nodes of the hidden layer, the dimensionality of the data increases and thus decompression or decoding is performed.

Meanwhile, the AE controls the strength of connection of neurons through learning, such that input data is represented as hidden-layer data. In the hidden layer, information is represented by fewer neurons than neurons of the input layer, and reproducing input data as output may mean that the hidden layer finds a hidden pattern from the input data and expresses the hidden pattern.

Semi-supervised learning is a kind of machine learning that makes use of both labeled training data and unlabeled training data.

One semi-supervised learning technique involves inferring the label of unlabeled training data and then performing learning using the inferred label. This technique may be useful when labeling cost is high.

Reinforcement learning is a theory that an agent is capable of finding an optimal path based on experience without reference to data when an environment in which the agent may decide what action is taken every moment is given.

Reinforcement learning may be mainly performed by a Markov decision process (MDP).

The MDP will be briefly described. First, an environment including information necessary for the agent to take a subsequent action is given. Second, what action is taken by the agent in that environment is defined. Third, a reward given to the agent when the agent successfully takes a certain action and a penalty given to the agent when the agent fails to take a certain action are defined. Fourth, experience is repeated until a future reward is maximized, thereby deriving an optimal action policy.

The ANN may specify the structure thereof by a configuration, an activation function, a loss or cost function, a learning algorithm, and an optimization algorithm, of a model. Hyperparameters may be preconfigured before learning, and model parameters may then be configured through learning to specify the contents of the ANN.

For instance, the structure of the ANN may be determined by factors, including the number of hidden layers, the number of hidden nodes included in each hidden layer, an input feature vector, and a target feature vector.

The hyperparameters include various parameters which need to be initially configured for learning, such as initial values of the model parameters. The model parameters include various parameters to be determined through learning.

For example, the hyperparameters may include an initial value of a weight between nodes, an initial value of a bias between nodes, a mini-batch size, a learning iteration number, and a learning rate. Furthermore, the model parameters may include the weight between nodes and the bias between nodes.

The loss function may be used as an index (reference) for determining an optimal model parameter during a learning process of the ANN. Learning in the ANN may mean a process of manipulating model parameters so as to reduce the loss function, and the purpose of learning may be determining the model parameters that minimize the loss function.

The loss function may typically use a means squared error (MSE) or cross-entropy error (CEE), but the present disclosure is not limited thereto.

The CEE may be used when a correct answer label is one-hot encoded. One-hot encoding is an encoding method in which only for neurons corresponding to a correct answer, a correct answer label value is set to be 1 and, for neurons that do not correspond to the correct answer, the correct answer label value is set to be 0.

Machine learning or deep learning may use a learning optimization algorithm to minimize the loss function. Examples of the learning optimization algorithm include gradient descent (GD), stochastic gradient descent (SGD), momentum, Nesterov accelerate gradient (NAG), AdaGrad, AdaDelta, RMSProp, Adam, and Nadam.

GD is a method that adjusts the model parameters in a direction that reduces a loss function value in consideration of the slope of the loss function in a current state.

The direction in which the model parameters are adjusted is referred to as a step direction, and a size by which the model parameters are adjusted is referred to as a step size. Here, the step size may mean a learning rate.

GD may obtain a slope of the loss function through partial derivative using each of the model parameters and update the model parameters by adjusting the model parameters by the learning rate in the direction of the obtained slope.

SGD is a method that separates training data into mini batches and increases the frequency of GD by performing GD for each mini batch.

AdaGrad, AdaDelta, and RMSProp are methods that increase optimization accuracy in SGD by adjusting the step size. Momentum and NAG are methods that increase optimization accuracy in SGD by adjusting the step direction. Adam is a method that combines momentum and RMSProp and increases optimization accuracy by adjusting the step size and the step direction. Nadam is a method that combines NAG and RMSProp and increases optimization accuracy by adjusting the step size and the step direction.

The learning rate and accuracy of the ANN greatly rely not only on the structure and learning optimization algorithms of the ANN but also on the hyperparameters. Therefore, in order to obtain a good learning model, it is important to configure a proper hyperparameter as well as determining a proper structure and learning algorithm of the ANN.

In general, the ANN is trained by experimentally configuring the hyperparameters as various values, and an optimal hyperparameter that provides a stable learning rate and accuracy as a result of learning is configured.

FIG. 1 is a block diagram illustrating a structure of an artificial intelligence cleaner 100 according to an embodiment of the present disclosure.

Referring to FIG. 1, the artificial intelligence cleaner 100 according to an embodiment of the present disclosure may include an image sensor 110, a microphone 120, an obstacle detector 130, a wireless communicator 140, a memory 150, and a travel driver, and a processor 190.

The artificial intelligence cleaner 100 will hereinafter be referred to as a terminal 100.

The image sensor 110 may acquire image data about the surroundings of the artificial intelligence cleaner 100.

The image sensor 110 may include one or more of a depth sensor 111 and an RGB sensor 113.

The depth sensor 111 may detect that light emitted from a light emitter (not shown) is reflected from an object and returned. The depth sensor 111 may measure a distance to the object based on a time difference between a light emission time and a light reception time, the intensity of returned light (received light), and the like.

The depth sensor 111 may acquire two-dimensional (2D) or three-dimensional (3D) image information about the surroundings of the artificial intelligence cleaner 100 based on the measured distance between objects.

The RGB sensor 113 may obtain color image information about objects around the artificial intelligence cleaner 100. The color image information may be a captured image of each object. The RGB sensor 113 may be referred to as an RGB camera.

The microphone 120 may receive a user's voice. The received voice of the user may be analyzed through a voice server (not shown).

At this time, the user's voice may be a voice signal for controlling the artificial intelligence cleaner 100.

The obstacle detector 130 may include an ultrasonic sensor, an infrared sensor, a laser sensor, etc. For example, the obstacle detector 130 may irradiate laser light to a cleaning area, and may extract a pattern of the reflected laser light.

The obstacle detector 130 may detect one or more obstacles based on the position and pattern of the extracted laser light.

When the depth sensor 110 is used to detect the obstacle, the configuration of the obstacle detector 130 may be omitted.

The wireless communicator 140 may include at least one of a wireless Internet module and a short-range communication module.

The mobile communication module may transmit and receive radio frequency (RF) signals (also called wireless signals) to and from at least one of a base station (BS), an external user equipment (UE), and a server over a mobile communication network constructed according to technical standards for mobile communication or communication methods (for example, GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc.).

The wireless Internet module may refer to a module for wireless Internet access, and may be embedded in or external to the terminal 100. The wireless Internet module 113 is configured to transmit and receive RF signals over a communication network according to wireless Internet technologies.

The wireless Internet technology may include, for example, Wireless LAN (WLAN), Wi-Fi, Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), etc.

The short-range communication module may be configured to facilitate short-range communications. Suitable technologies for implementing such short-range communications include Bluetooth™. Radio Frequency IDentification (RFID), Infrared Data Association (IrDA), Ultra-WideBand (UWB), ZigBee, Near Field Communication (NFC), Wi-Fi, Wi-Fi Direct, Wireless Universal Serial Bus (Wireless USB), and the like.

The memory 150 may store a simultaneous localization and mapping (SLAM) map created through a simultaneous localization and mapping (SLAM) algorithm.

The movement detection sensor 160 may detect the movement of the artificial intelligence cleaner 100. Specifically, the movement detection sensor 160 may detect that the artificial intelligence cleaner 100 is lifted and moved by the user.

The movement detection sensor 160 may include at least one of a floor detection sensor 161 and a gyro sensor 163.

The floor detection sensor 161 may detect whether the artificial intelligence cleaner 100 has moved by the user using infrared rays. A detailed description thereof will be given later with reference to the attached drawings.

The gyro sensor 163 may measure the angular velocity of the artificial intelligence cleaner 100 for each of X-axis, Y-axis, and Z-axis. The gyro sensor 163 may detect movement of the artificial intelligence cleaner 100 by the user using the amount of change in angular velocity for each axis.

In addition, the movement detection sensor 160 may further include a wheel sensor, a cliff sensor, etc., and may be used to detect movement of the artificial intelligence cleaner 100 by the user.

The travel driver 170 may move the artificial intelligence cleaner 100 toward a specific direction or may move the artificial intelligence cleaner 100 by a specific distance.

The travel driver 170 may include a left-wheel driver 171 for driving a left wheel of the artificial intelligence cleaner 100 and a right-wheel driver 173 for driving a right wheel of the artificial intelligence cleaner 100.

The left-wheel driver 171 may include a motor for driving the left wheel, and the right-wheel driver 173 may include a motor for driving the right wheel.

Although FIG. 1 has disclosed the travel driver 170 including both the left-wheel driver 171 and the right-wheel driver 173 as an example, the scope of the present disclosure is not limited thereto, and it should be noted that, if there is only one wheel, only one driver may be provided.

The processor 190 may control the overall operation of the artificial intelligence cleaner 100.

Figure 2:
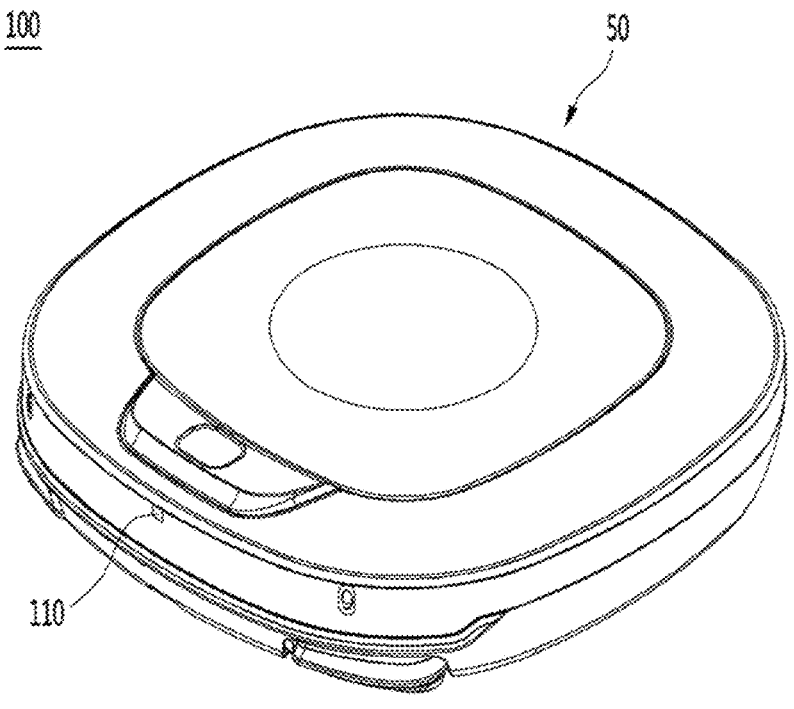
FIG. 2 is a perspective view illustrating the artificial intelligence cleaner according to an embodiment of the present disclosure.

FIG. 2 is a perspective view illustrating the artificial intelligence cleaner 100 according to an embodiment of the present disclosure.

Referring to FIG. 2, the artificial intelligence cleaner 100 may include a cleaner body 50 and an image sensor 110 provided on a top surface of the cleaner body 50.

The image sensor 110 may radiate light to the front and receive reflected light.

The image sensor 110 may obtain depth information using a time difference between a light emission time and a light reception time where the returned light is received.

The cleaner body 50 may include components other than the image sensor 110 from among the components described in FIG. 1.

Figure 3:
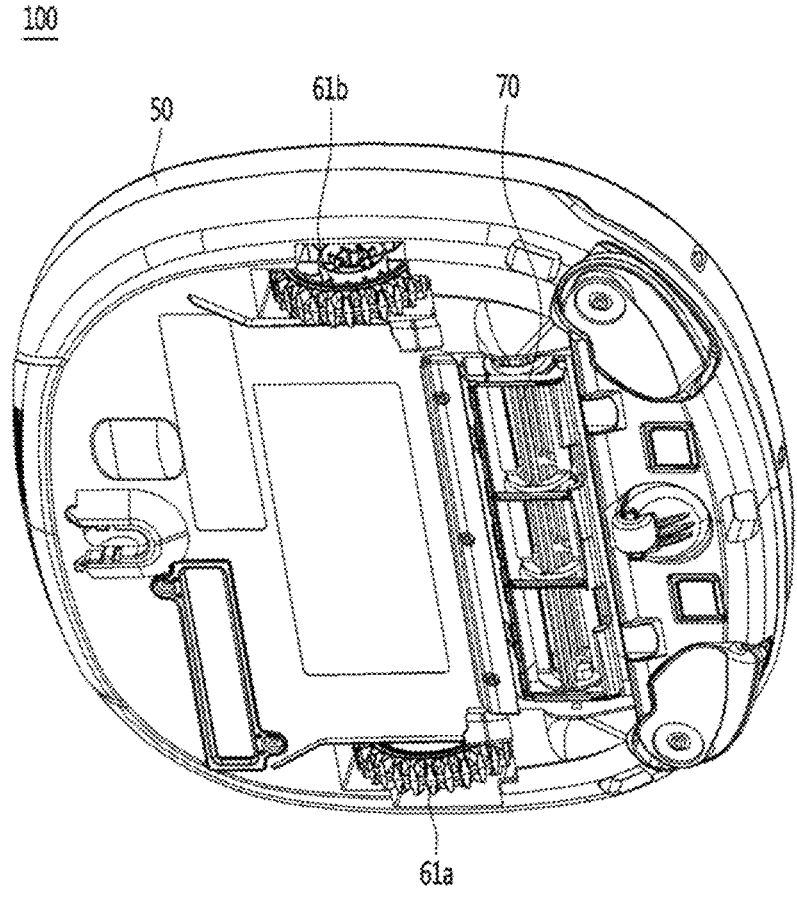
FIG. 3 is a bottom view illustrating the artificial intelligence cleaner according to an embodiment of the present disclosure.

FIG. 3 is a bottom view illustrating the artificial intelligence cleaner 100 according to an embodiment of the present disclosure.

Referring to FIG. 3, in addition to the constituent components shown in FIG. 1, the artificial intelligence cleaner 100 may further include a cleaner body 50, a left wheel 61*a*, a right wheel 61*b*, and a suctioner 70.

The left wheel 61*a* and the right wheel 61*b* may drive the cleaner body 50.

The left-wheel driver 171 may drive the left wheel 61*a*, and the right-wheel driver 173 may drive the right wheel 61*b*.

As the left wheel 61*a* and the right wheel 61*b* are rotated by the travel driver 170, the artificial intelligence cleaner 100 may suction foreign substances such as dust or trash through the suctioner 70.

The suctioner 70 may be provided in the cleaner body 50 and may suction dust from the floor.

The suctioner 70 may further include a filter (not shown) that collects foreign substances from the suctioned airflow, and a foreign-material receptor (not shown) in which foreign substances collected by the filter are accumulated.

Figure 4:
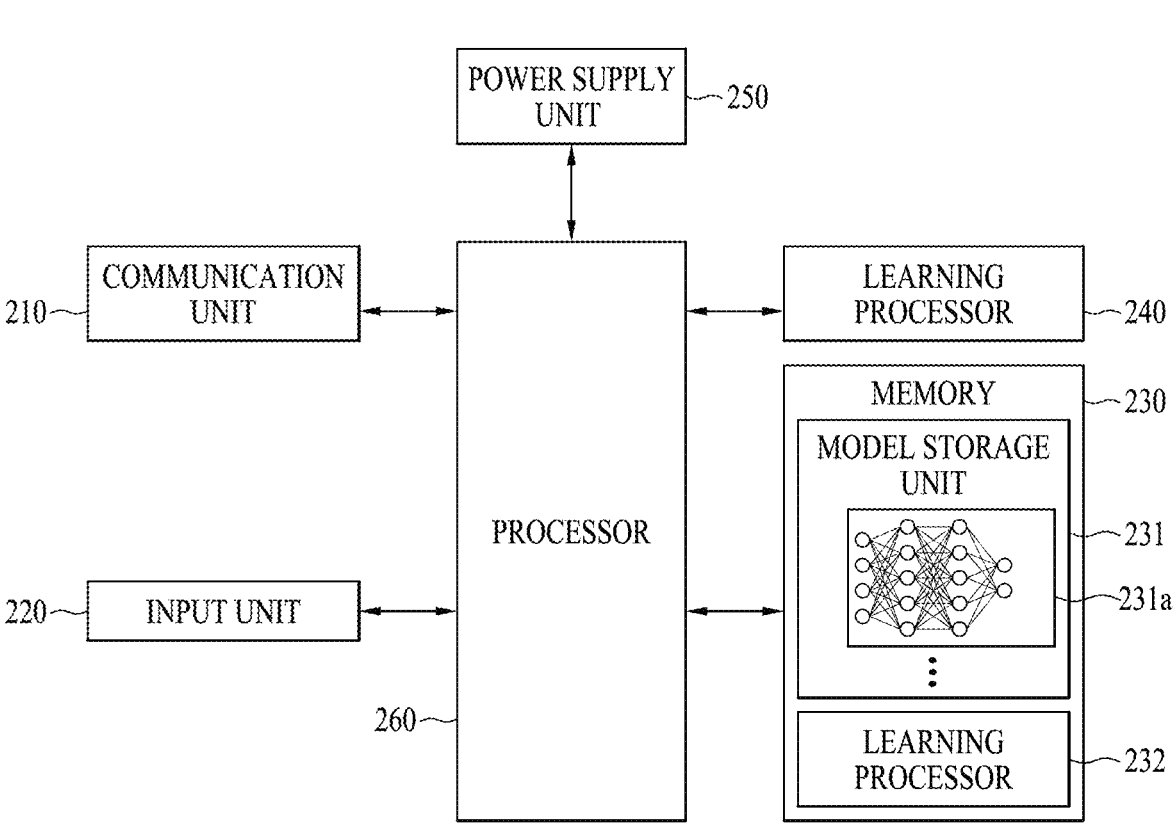
FIG. 4 is a block diagram illustrating a structure of the artificial neural network learning device according to an embodiment of the present disclosure.

FIG. 4 is a block diagram illustrating a configuration of the learning device 200 for an artificial neural network according to one embodiment of the present disclosure.

The learning device 200 may be configured to receive, classify, store, and output information to be utilized for data mining, data analysis, intelligent decision making, and machine learning algorithms. Here, the machine learning algorithms may include a deep learning algorithm.

The learning device 200 may communicate with the at least one terminal 100, and may analyze or learn data on behalf of or by assisting the terminal 100 to derive results. In this context, assisting another device may mean distributing computational power through distributed processing.

The learning device 200 of the artificial neural network represents various devices for learning the artificial neural network, and may generally refer to a server. It may be referred to as a learning device, a learning server, or the like.

In particular, the learning device 200 may be implemented not only as a single server, but also as a set of multiple server, a cloud server, or combinations thereof.

That is, multiple learning devices 200 may be configured to form a learning device set (or cloud server), and at least one learning device 200 in the learning device set may analyze or learn data through distributed processing to derive results.

The learning device 200 may transmit a model trained by machine learning or deep learning to the terminal 100 periodically or on a request.

Alternatively, the learning device 200 may store a trained (or learned) model, and may transmit a result value derived through the trained model to the artificial intelligence cleaner 100 when there is a request from the artificial intelligence cleaner 100.

Referring to FIG. 4, the learning device 200 may include a communicator 210, an inputter 220, a memory 230, a learning processor 240, a power supplier 250, and a processor 260.

The communicator 210 may correspond to an element including the wireless communicator 110.

The inputter 220 may acquire training data for model training and input data for acquiring an output using a trained model.

The inputter 220 may acquire unprocessed input data. In this case, the processor 260 may preprocess the acquired data to generate training data or preprocessed input data that can be input to the model training.

In this case, the preprocessing of the input data performed by the inputter 220 may mean extracting input features from the input data.

The memory 230 may store a model trained through a machine learning algorithm or a deep learning algorithm, data trained by the model, and/or input data, etc.

The memory 230 may include a model storage 231 and a database 232.

The model storage 231 stores a model (or artificial neural network) 231*a* that is being trained or has been trained by the learning processor 240, and stores the updated model when the model is updated through training.

In this regard, the model storage 231 may store the trained model in a plurality of versions depending on the time of training or the training progress as needed.

The artificial neural network 231*a* shown in FIG. 4 is merely an example of an artificial neural network including multiple hidden layers, and the artificial neural network of the present disclosure is not limited thereto.

The artificial neural network 231*a* may be implemented in hardware, software, or a combination of hardware and software. When a part or the entirety of the artificial neural network 231*a* is implemented in software, one or more instructions constituting the artificial neural network 231*a* may be stored in the memory 230.

The database 232 stores input data acquired through the inputter 220, training data used to train the model, the training history of the model, and the like.

The input data stored in the database 232 may be raw input data or data that has been processed to be suitable for model training.

The training processor 240 may train the artificial neural network 231*a* using training data or a training set.

The learning processor 240 may train the artificial neural network 231*a* by directly acquiring data obtained by preprocessing the input data acquired by the processor 260 through the inputter 220, or by acquiring preprocessed input data stored in the database 232.

Specifically, the learning processor 240 may iteratively train the artificial neural network 231*a* using various training techniques described above to determine optimized model parameters for the artificial neural network 231*a*.

In the present disclosure, an artificial neural network whose parameters are determined by training using training data may be referred to as a trained model.

In this case, the trained model may be embedded on the training device 200 of the artificial neural network to infer a result value, or may be transmitted to another device such as the terminal 100 through the communicator 210 so as to be embedded on the other device.

Furthermore, when the learning model is updated, the updated learning model may be transmitted to another device such as the terminal 100 through the communicator 210 and embedded on the other device.

The power supplier 250 supplies power.

Hereinafter, a redundant description of the corresponding configurations will be omitted.

Figure 5:
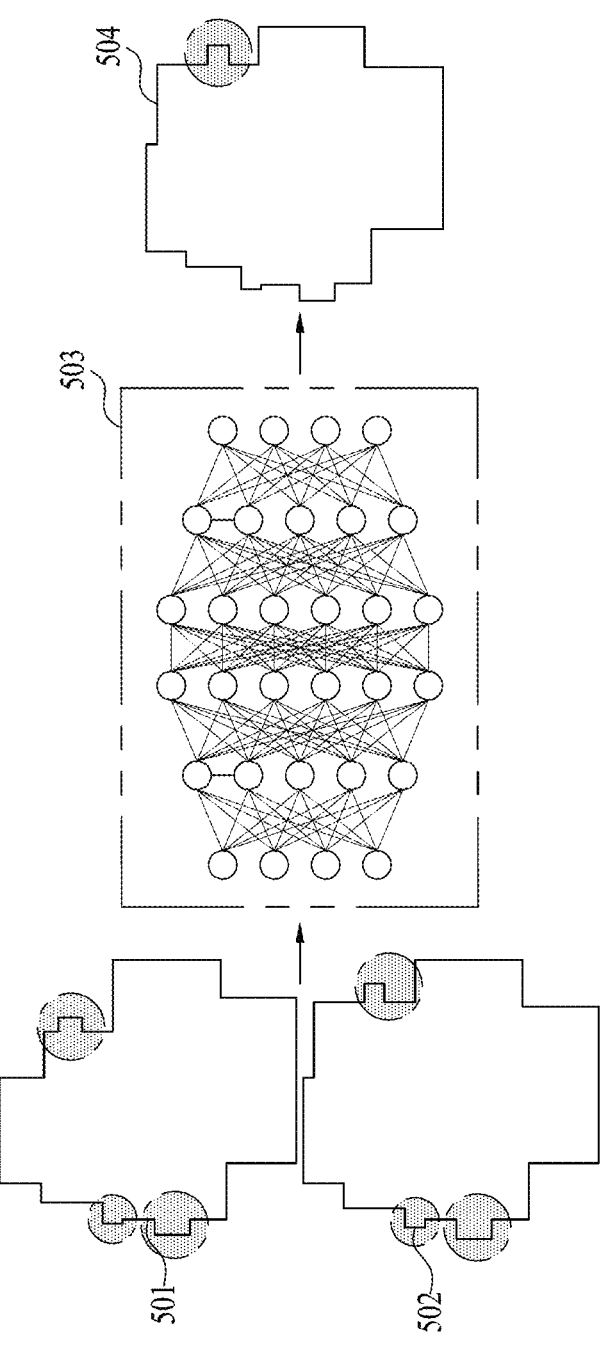
FIG. 5 is a diagram illustrating an example of a deep learning-based cleaning area segmentation model according to an embodiment of the present disclosure.

FIG. 5 is a diagram illustrating an example of a deep learning-based cleaning area segmentation model according to an embodiment of the present disclosure.

Referring to FIG. 5, the deep learning-based cleaning area segmentation model 503 may include an artificial neural network.

The deep learning-based cleaning area segmentation model 503 may be a personalized model that is individually trained for each user.

The deep learning-based cleaning area segmentation model 503 may be a segmentation model.

For example, the deep learning-based cleaning area segmentation model 503 may be implemented as a model such as fully convolutional network (FCN), U-net, SegNet, or DeepLab.

The deep learning-based cleaning area segmentation model 503 may be a model for outputting a map formed with a plurality of cleaning areas upon receiving not only map data corresponding to a cleaning space but also cleaning histories (501, 502) of the corresponding cleaning space.

The map corresponding to the cleaning space may be a SLAM map for the cleaning space.

Each cleaning history may include at least one of the number of curvatures (curved paths), a cleaning consumption time, information about whether cleaning is performed, a cleaning result value, the number of cleaning times, information about whether the obstacle is detected, and information about whether an external situation occurs. A detailed description thereof will be given later.

Although FIG. 5 shows that input data about the cleaning history includes a map for convenience of description, the scope of the present disclosure is not limited thereto, and it should be noted that map data and cleaning history data may also be input as separate data (different data).

For example, the SLAM map may be input as map data, and coordinates within the SLAM map and information about each coordinate within the SLAM map may be input as the cleaning history data.

The deep learning-based cleaning area segmentation model 503 may be trained using training data.

The training data may include input data for training (hereinafter referred to as 'training input data') and labeling information corresponding to the training input data.

The training input data may include a map corresponding to a cleaning space and cleaning histories related to the cleaning space.

The labeling information may be a map in which a plurality of cleaning areas corresponding to the training input data is divided.

At this time, labeling information may be manually determined by a user, developer, or designer.

Here, the labeling information may include information about the area type.

The deep learning-based cleaning area segmentation model 503 may be trained to reduce a difference between output data and labeling information corresponding to the training input data upon receiving the training input data included in the training data. The difference between the output data and the labeling information may be expressed as a loss function or a cost function, and the deep learning-based cleaning area segmentation model 503 may be trained to minimize the loss function.

That is, the deep learning-based cleaning area segmentation model 503 may output a map that classifies the cleaning areas based on the area types, and thus each cleaning area can be classified into one area type.

The deep learning-based cleaning area segmentation model 503 may be a model that is trained and stored through the processor 190 of the artificial intelligence cleaner 100. However, the deep learning-based cleaning area segmentation model 503 may be trained through the external learning device 200 and may be received through the wireless communicator 140.

In particular, the artificial intelligence cleaner 100 may obtain a feedback of a user, may generate labeling information corresponding to the cleaning history based on the user feedback, and may generate the corresponding cleaning history and labeling information as training data. Furthermore, the generated training data can be used to update the deep learning-based cleaning area segmentation model 503.

Whereas the update of the deep learning-based cleaning area segmentation model 503 may be performed by the processor 190 of the artificial intelligence cleaner 100, such update may also be performed by the external learning device 200.

Figure 6:
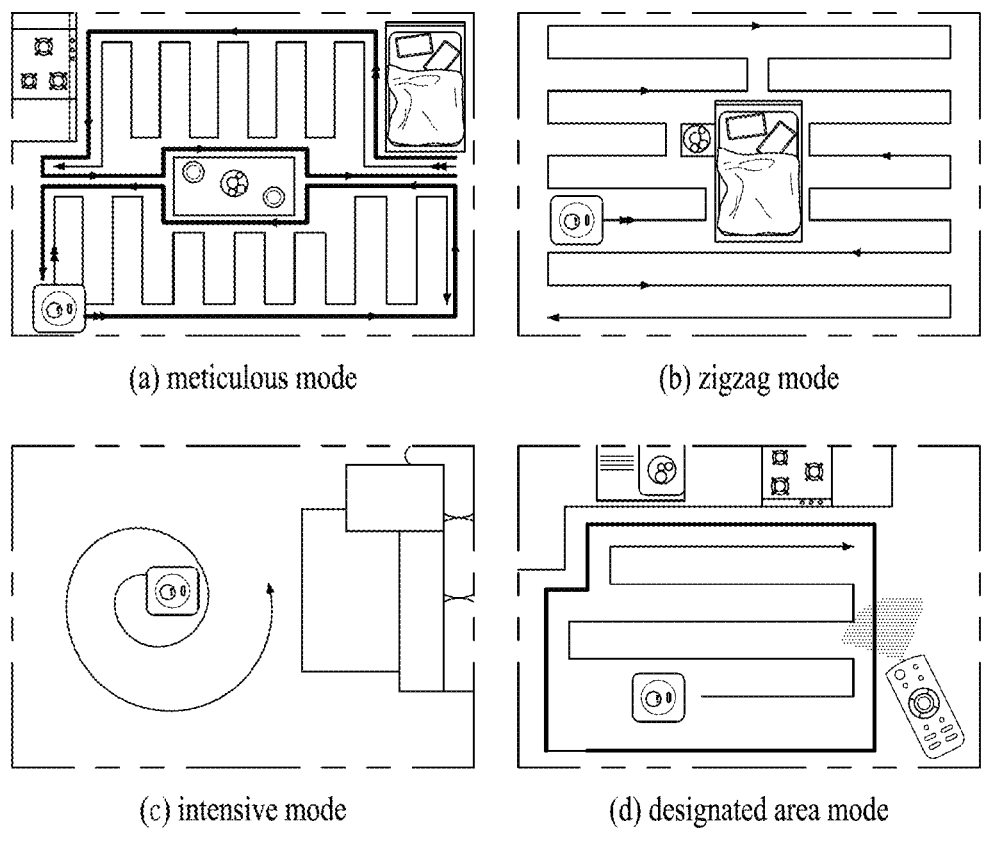
FIG. 6 is a diagram illustrating example cleaning modes of the artificial intelligence cleaner according to an embodiment of the present disclosure.

FIG. 6 is a diagram illustrating example cleaning modes of the artificial intelligence cleaner 100 according to an embodiment of the present disclosure.

FIG. 6(*a*) shows a path of a meticulous mode of the artificial intelligence cleaner 100, FIG. 6(*b*) shows a path of a zigzag mode of the artificial intelligence cleaner 100, and FIG. 6(*c*) shows a path of an intensive mode of the artificial intelligence cleaner 100, and FIG. 6(*d*) shows a path of a designated area mode of the artificial intelligence cleaner 100.

Referring to FIG. 6(*a*), when the meticulous mode is set, the artificial intelligence cleaner 100 may form a path to thoroughly clean a target area to be cleaned based on the SLAM map stored in the memory. Accordingly, the artificial intelligence cleaner 100 not only cleans all areas through which the artificial intelligence cleaner 100 may pass based on the SLAM map in a zigzag manner, but also cleans the target area by moving once more along the outermost path of the target area.

Referring to FIG. 6(*b*), when the zigzag mode is set, the artificial intelligence cleaner 100 may clean the target area in a zigzag manner based on the SLAM map stored in the memory. Compared to FIG. 6(*a*), the artificial intelligence cleaner 100 may clean the remaining area other than the outermost path of the target area by moving along the zigzag path in the target area.

Referring to FIG. 6(*c*), when the intensive mode is set, the artificial intelligence cleaner 100 may clean while passing through a spiral path centered on a selected point 601.

Referring to FIG. 6(*d*), when the designated area mode is set, the artificial intelligence cleaner 100 may clean a selected area 602 using the meticulous mode shown in FIG. 6(*a*).

In other words, the artificial intelligence cleaner 100 may recognize the target area through a sensor, etc., and then proceed with cleaning by creating a consistent path satisfying a standardized pattern based on the operation mode set by the user (i.e., the user-set mode). However, in this case, under various constraints, there may occur a situation in which the problem should be solved after stopping cleaning, or another situation in which the user must directly intervene in and cope with the problem. This is because consideration of various situations was created based on the user's countermeasure.

As described above, according to the mode setting information (e.g., a meticulous mode, a zigzag mode, an intensive mode, a designated area mode, etc.) of the existing artificial intelligence cleaner 100, the artificial intelligence cleaner 100 is designed to receive the mode setting information from the user, so that there may occur the problem in which the user should directly determine the constraint conditions.

For example, in a situation where the user sets the meticulous mode, the remaining battery lifespan of the artificial intelligence cleaner 100 may not be enough to perform the meticulous mode.

In other words, from the perspective of the artificial intelligence cleaner that must clean all areas within a preset time, it may be inefficient to thoroughly clean all areas. For example, if the battery lifespan is insufficient, if the dust bin of the artificial intelligence cleaner 100 is full, or if a user request that instructs the artificial intelligence cleaner 100 to quickly finish cleaning is received, the artificial intelligence cleaner 100 may simplify (or smooth) the cleaning path and finish cleaning by moving along the simplified path.

Therefore, the present disclosure proposes a method that allows cleaning to be performed as quickly and simply as possible even under various constraints without the need for user intervention. Accordingly, the artificial intelligence cleaner 100 may provide the user with additional values in terms of usability and convenience.

In particular, due to various internal and external situations, there may occur an example case in which the artificial intelligence cleaner 100 must clean a maximum area of the target area within a given time. For example, there may occur situations in which the cleaning path should be modified or changed due to occurrence of various situations in which a user mode is additionally set, a battery lifespan is insufficient, the remaining space of the dust bin is insufficient, and/or the obstacle is present on the cleaning path.

In this case, the artificial intelligence cleaner requires the following determination function when performing path simplification of the cleaning path during cleaning. More specifically, the artificial intelligence cleaner must determine whether to perform cleaning simplification of the detailed cleaning path for each target area, and may determine the degree of path simplification. In addition, the artificial intelligence cleaner must determine whether to perform path simplification of the detailed cleaning path based on external situations (e.g., a situation of obstacle detection or a situation of user mode setting reception). In addition, the artificial intelligence cleaner must determine whether to perform path simplification of the detailed cleaning path based on the in-device resource situation (e.g., insufficient battery lifespan or insufficient space in the dust bin). Finally, the artificial intelligence cleaner must improve a method for performing path simplification for each situation based on the cleaning history and user feedback. Accordingly, the present disclosure seeks to propose an artificial intelligence cleaner that performs the above-described functions.

In addition, various embodiments described below are assumed to be performed by the processor of the artificial intelligence cleaner, but for convenience of explanation, the following embodiments will be described as being performed by the artificial intelligence cleaner.

Figure 7:
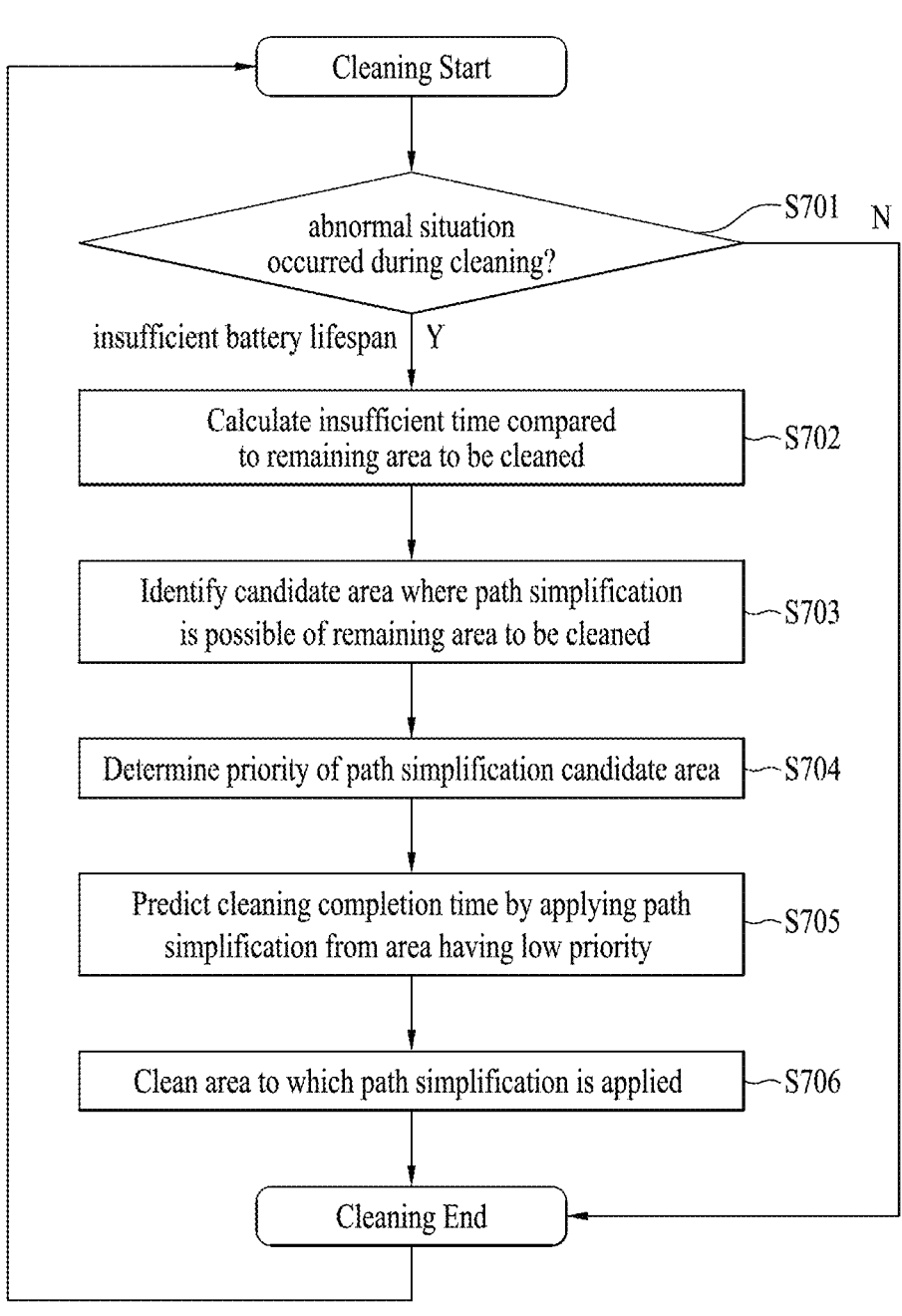
FIG. 7 is a flowchart illustrating a method for operating the artificial intelligence cleaner according to an embodiment of the present disclosure.

FIG. 7 is a flowchart illustrating a method for operating the artificial intelligence cleaner according to an embodiment of the present disclosure.

Referring to FIG. 7, in step S701, the artificial intelligence cleaner may determine whether an abnormal situation occurs during cleaning based on the cleaning path. At this time, the abnormal situation may be determined through information collected from various sensors provided in the artificial intelligence cleaner. At this time, various sensors may include an RGB camera, an RGB-D camera, a cliff sensor, etc. Here, the cleaning path may correspond to the cleaning path determined in consideration of the SLAM map and the plurality of collected cleaning histories.

In one embodiment of the present disclosure, the abnormal situation may include a situation in which the remaining battery lifespan of the artificial intelligence cleaner is insufficient and the remaining space in the dust bin of the artificial intelligence cleaner is insufficient. In addition, the situation in which the remaining battery lifespan is insufficient may include not only a case where the remaining battery lifespan drops to a preset level or less, but also a case where it is difficult for the artificial intelligence cleaner to return to the charging device after finishing cleaning in the existing cleaning mode due to insufficient battery lifespan during cleaning.

Figure 10:
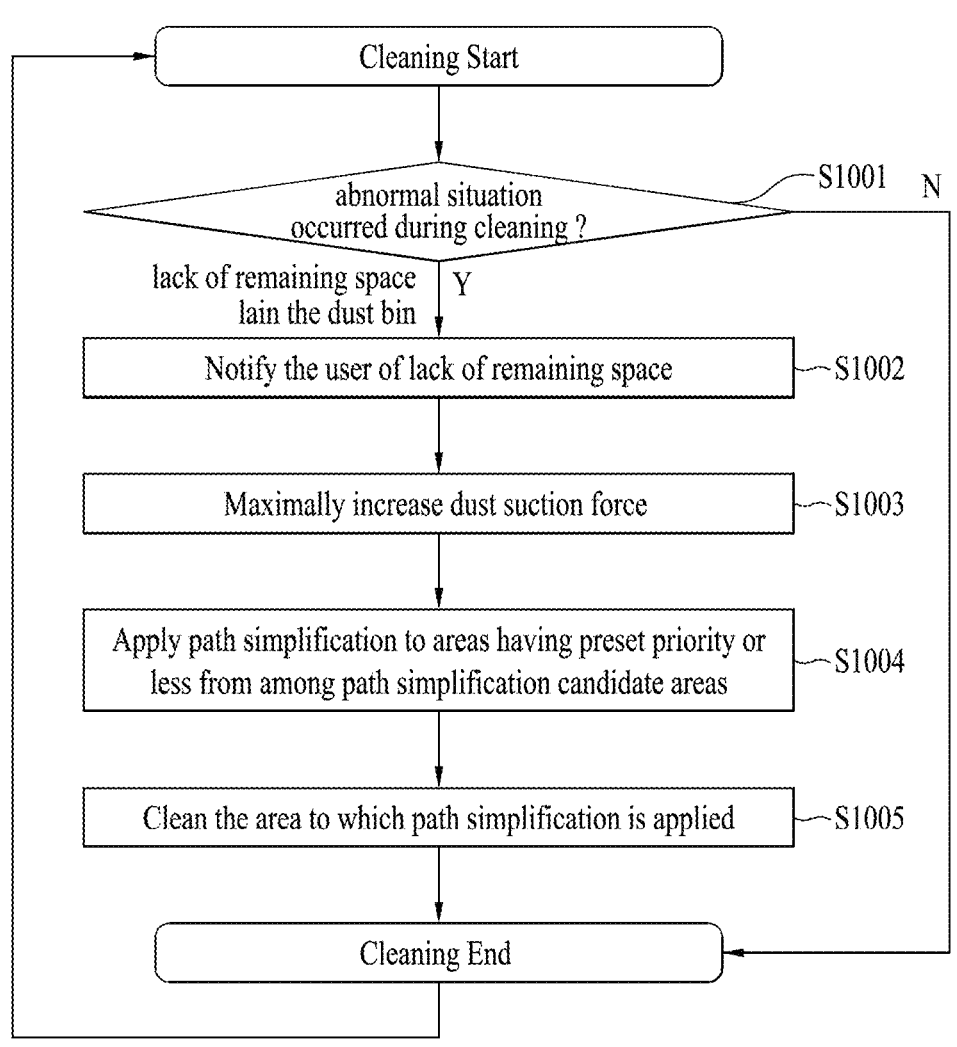
FIG. 10 is a flowchart illustrating a method for operating the artificial intelligence cleaner according to another embodiment of the present disclosure.

FIG. 7 shows the situation in which the remaining battery lifespan of the artificial intelligence cleaner is insufficient, and FIG. 10 shows the situation in which the remaining space in the dust bin of the artificial intelligence cleaner is insufficient.

In step S702, the artificial intelligence cleaner may calculate an insufficient operable time compared to the remaining cleaning target area.

In step S703, the artificial intelligence cleaner may identify at least one candidate area where path simplification is possible from among the remaining cleaning target areas.

In step S704, the artificial intelligence cleaner may determine the priority (importance) of at least one path simplification candidate area.

In step S705, the artificial intelligence cleaner may sequentially apply path simplification to a plurality of path simplification candidate areas arranged in ascending priority order. In one embodiment of the present disclosure, the term "priority" or "importance" may be determined based on the number of vertices compared to a preset area based on the SLAM map. This will be explained in detail with reference to FIG. 8.

Additionally, the artificial intelligence cleaner may predict the cleaning completion time after completion of path simplification. Here, the cleaning completion time may correspond to a time obtained by summing all time periods during which the artificial intelligence cleaner must stay in the target area to be cleaned. In one embodiment of the present disclosure, the artificial intelligence cleaner may predict the cleaning completion time based on the reduced number of wheel rotations after completion of path simplification.

In step S706, the artificial intelligence cleaner may clean the cleaning target area to which path simplification has been applied. At this time, although not shown in the drawing, the artificial intelligence cleaner may control the travel driver according to the determined cleaning path. At this time, the artificial intelligence cleaner may store the newly determined cleaning path in the memory.

Thereafter, the above-described steps S701 to S706 may be repeatedly performed based on the remaining battery lifespan. More specifically, the artificial intelligence cleaner may predict the cleaning completion time after completion of path simplification, and may determine whether to finish cleaning in the existing mode using the current battery lifespan based on the predicted time. This is because, unlike when performing the first steps S701 to S706, when the artificial intelligence cleaner actually performs cleaning, the battery power of the artificial intelligence cleaner that moves by colliding with the obstacle may be further consumed, so that the actually consumed battery power of the artificial intelligence cleaner should be confirmed. Accordingly, the artificial intelligence cleaner may repeatedly perform steps S701 to S706 in real time to continuously check the remaining battery lifespan, may predict a cleaning completion time, and may perform path simplification based on the predicted cleaning completion time.

Figure 8:
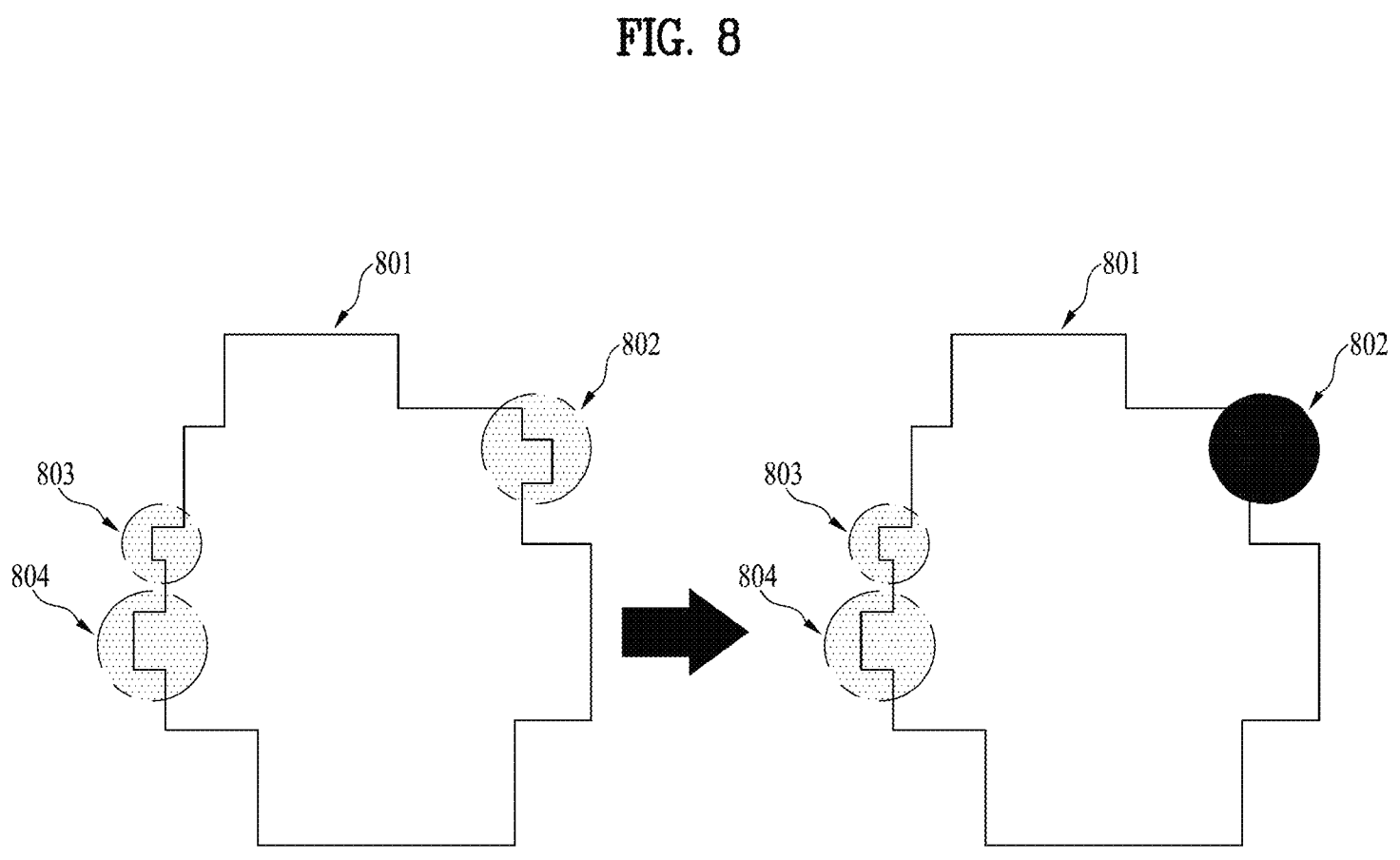

FIG. 8 is a conceptual diagram illustrating a method for performing path simplification in the artificial intelligence cleaner according to an embodiment of the present disclosure.

FIG. 8 shows the cleaning target area 801 to be cleaned by the artificial intelligence cleaner. At this time, as described above with reference to FIG. 7, the artificial intelligence cleaner may detect that an abnormal situation has occurred during cleaning. At this time, the abnormal situation may include a case where the remaining battery lifespan remains below a preset remaining level (for example, 50%), a case where the remaining space in the dust bin is insufficient, a case where an obstacle is discovered, and a case where a new user mode setting is requested.

In one embodiment of the present disclosure, the artificial intelligence cleaner may identify at least one candidate area (802, 803, 804) in which path simplification is possible from among the remaining cleaning target areas.

Here, at least one candidate area (802, 803, 804) in which path simplification is possible may correspond to a region in which the number of curvatures (i.e., the number of vertices) included in a preset area range based on the SLAM map stored in the memory of the artificial intelligence cleaner is equal to or greater than a preset number. For example, a candidate area where path simplification is possible may correspond to an area with two or more vertices within a (50 cm×50 cm) area.

Additionally, according to another embodiment, the artificial intelligence cleaner may identify a cleaning area that is considered unimportant by the user, as at least one candidate area (802, 803, 804) where path simplification is possible, based on the existing cleaning history. For example, based on the existing cleaning history, if the user requests the artificial intelligence cleaner to clean the bedroom three times and to clean the living room three times during a preset period, and requests the artificial intelligence cleaner to clean the kitchen two times during the preset period, this means that the priority (importance) of each of the bedroom and the living room is denoted by 3 and the priority (importance) of the kitchen is denoted by 2.

Afterwards, the artificial intelligence cleaner may sequentially apply path simplification to a plurality of path simplification candidate areas arranged in ascending priority order based on the remaining battery lifespan. At this time, the priority (importance) becomes lower as the number of curvatures (i.e., the number of vertices) increases. For example, when the remaining battery lifespan (battery power) is 80%, the artificial intelligence cleaner may apply path simplification to the cleaning path of the first candidate area 802 with the lowest priority (importance). At this time, the method of applying path simplification to the cleaning path will be described in detail with reference to FIG. 9. In addition, for another example, when the remaining battery lifespan (battery power) is 50%, the artificial intelligence cleaner may apply path simplification to the cleaning path of the first candidate area 802 with the lowest priority (importance) and the cleaning path of the second candidate area 803 with the next lowest priority (importance).

In this way, the artificial intelligence cleaner may sequentially apply path simplification to the plurality of path simplification candidate areas arranged in ascending priority order based on the remaining battery lifespan.

Figure 9:
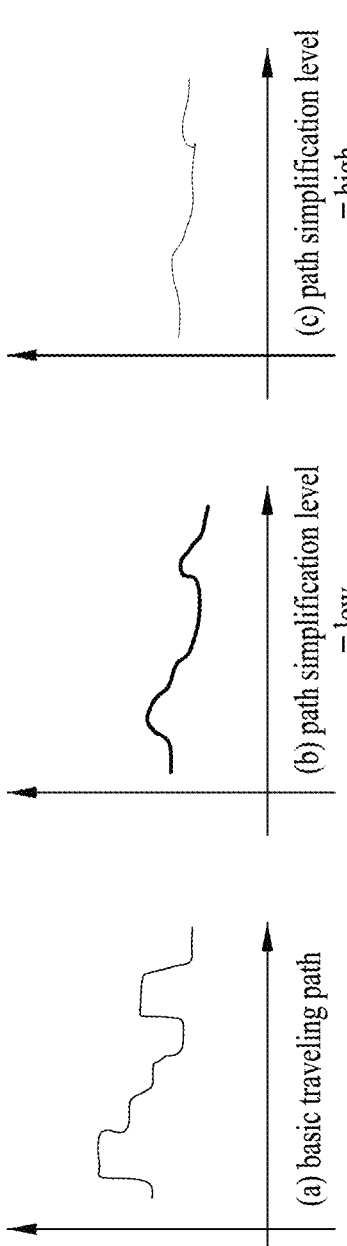
FIG. 9 is a conceptual diagram illustrating a method for simplifying a path of the artificial intelligence cleaner according to an embodiment of the present disclosure.

FIG. 9 is a conceptual diagram illustrating a method for performing path simplification in the artificial intelligence cleaner according to an embodiment of the present disclosure.

FIG. 9(*a*) shows a basic traveling path, FIG. 9(*b*) shows a case where a path simplification level is low, and FIG. 9(*c*) shows a case where a path simplification strength level is high.

More specifically, FIG. 9(*a*) shows that the artificial intelligence cleaner performs cleaning while moving along the basic cleaning path of the target area (A). At this time, the X-axis of the graph of FIG. 9(*a*) may represent the traveling direction of the artificial intelligence cleaner, and the Y-axis of the graph of FIG. 9(*a*) may represent a reference point for each certain section of the cleaning path.

In one embodiment of the present disclosure, the level of path simplification may vary depending on the number of reference points allocated to the section for calculating the average value. For example, as the number of reference points within the section increases, the level of path simplification increases.

That is, FIG. 9(*b*) shows a case where the number of reference points within the section is small, and FIG. 9(*c*) shows a case where the number of reference points within the section is large.

Referring to FIG. 9(*b*), because the number of reference points within the section is small, the artificial intelligence cleaner may be configured such that a low path simplification level is applied to the artificial intelligence cleaner according to the X-axis direction which is the same proceeding direction as in FIG. 9(*a*) showing the basic traveling path.

On the other hand, referring to FIG. 9(*c*), since the number of reference points within the section is large, the artificial intelligence cleaner may be configured such that a high path simplification level is applied to the artificial intelligence cleaner according to the X-axis direction which is the same proceeding direction as in FIG. 9(*a*) showing the basic traveling path.

FIG. 10 is a flowchart illustrating a method for operating the artificial intelligence cleaner according to another embodiment of the present disclosure. FIG. 10 shows an example of a situation in which the remaining space in the dust bin is insufficient from among the abnormal situations shown in FIG. 7, and as such redundant description thereof will herein be omitted for brevity.

Referring to FIG. 10, in step S1001, the artificial intelligence cleaner may determine whether an abnormal situation occurs during cleaning based on the cleaning path.

In step S1002, the artificial intelligence cleaner may notify the user of lack of remaining space in the dust bin. In one embodiment of the present disclosure, if there is a user equipment (UE) connected to the artificial intelligence cleaner, the artificial intelligence cleaner may transmit a message about the lack of remaining space in the dust bin to the UE. Accordingly, the UE may output a message about the lack of remaining space in the dust bin. In addition, the artificial intelligence cleaner may notify the user of the lack of remaining space in the dust bin using a beep sound.

In step S1003, the artificial intelligence cleaner may maximize dust suction force of the artificial intelligence cleaner. At this time, if the user does not empty the dust bin even after an alarm sound indicating the lack of remaining space in the dust bin is output for user recognition in step S1002, the artificial intelligence cleaner may maximally increase the dust suction force for the remaining cleaning path by increasing output power thereof, or may perform step S1004.

In step S1004, the artificial intelligence cleaner may apply path simplification to some areas having a preset priority (importance) level or less from among path simplification candidate areas. At this time, the artificial intelligence cleaner may sequentially apply path simplification to the cleaning target areas arranged in ascending priority order by referring to the shortened predicted cleaning completion time for each path after completion of path simplification. Here, the cleaning target areas may be arranged in the order of low-priority (low importance) path simplification→high-priority (high importance) path simplification.

That is, steps S1003 and S1004 may be performed selectively or simultaneously.

In step S1005, the artificial intelligence cleaner may clean the cleaning target area to which path simplification has been applied.

After completion of such cleaning, the artificial intelligence cleaner may move to the cleaning station (i.e., a place where the dust bin of the artificial intelligence cleaner may be automatically emptied) or the charging dock (i.e., a wired/wireless charging device for the artificial intelligence cleaner).

Figure 11:
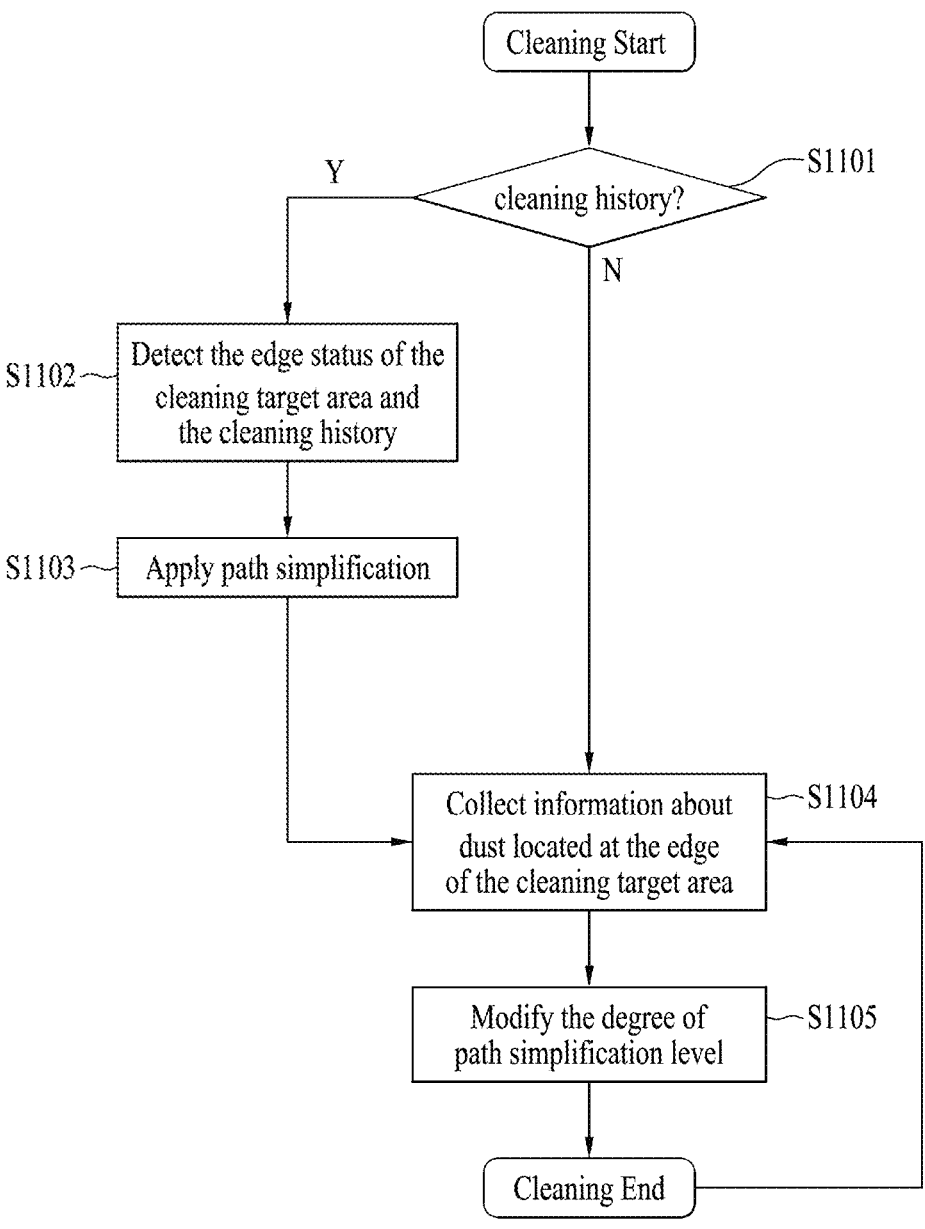
FIG. 11 is a flowchart illustrating a method for operating the artificial intelligence cleaner according to another embodiment of the present disclosure.

FIG. 11 is a flowchart illustrating a method for operating the artificial intelligence cleaner according to another embodiment of the present disclosure.

FIG. 11 shows a method for determining whether path simplification of the detailed cleaning path within the cleaning target area is applied to the artificial intelligence cleaner, and also shows a method for determining the level of such path simplification.

Referring to FIG. 11, in step S1101, the artificial intelligence cleaner may check whether there is a cleaning history for the cleaning target area after starting cleaning. At this time, the cleaning history may store information in units of each area about the edges of the preset area. Additionally, the cleaning history may include suction amount information acquired through a sensor located at the dust inlet and the number of direction changes within a preset area. For example, the cleaning history may include information about a large amount of dust suctioned from the area (A), information about an average amount of dust suctioned from the area (B), and information about a small amount of dust suctioned from the area (C). Additionally, as another example, the cleaning history may include information indicating that the number of direction changes in the area (A) is three '3', information indicating that the number of direction changes in the area (B) is one '1', and information indicating that the number of direction changes in the area (C) is four '4'.

If there is a cleaning history for the cleaning target area, the artificial intelligence cleaner may detect the edge (corner or vertex) status of the cleaning target area and the cleaning history (S1102).

In step S1103, the artificial intelligence cleaner may apply path simplification to the area where direction change is more frequently performed compared to the amount of dust intake based on the status and history of the edge of the cleaning target area.

More specifically, according to one embodiment of the present disclosure, the artificial intelligence cleaner may increase the level of path simplification as the dust intake amount decreases. At this time, the path simplification level is as described above in FIG. 9. Accordingly, in the areas with low dust intake, cleaning may be completed in a relatively clean manner even if the cleaning path is simplified.

Additionally, according to one embodiment of the present disclosure, path simplification may be applied to the area with the cleaning path having many curvatures (many vertices) so that direction change of the artificial intelligence cleaner frequently occurs in the area.

If the cleaning history exists, step S1104 may be performed in the artificial intelligence cleaner after completion of path simplification of the cleaning path according to steps S1102 and S1103.

If there is no cleaning history for the cleaning target area, in step S1104, the artificial intelligence cleaner may collect dust intake amount information at the edge of the cleaning target area.

More specifically, the artificial intelligence cleaner may estimate the amount of dust intake at the edge of the cleaning path using embedded sensors (e.g., camera, IR sensor, radar sensor, ultrasonic sensor, etc.) during cleaning. In addition, the artificial intelligence cleaner may determine the number of direction changes along the cleaning path by identifying the curves of the edges of the cleaning target area during cleaning.

According to one embodiment of the present disclosure, when the artificial intelligence cleaner performs cleaning, the artificial intelligence cleaner may identify the estimated dust intake amount for each cleaning target area and the number of direction changes for each cleaning target area, and may store the identified information for each cleaning target area.

In step S1105, the artificial intelligence cleaner may correct the degree of path simplification.

More specifically, the artificial intelligence cleaner may correct whether to perform path simplification and the level of such path simplification based on the amount of dust intake to the edge of the cleaning target area and the number of direction changes of the artificial intelligence cleaner (S1104). At this time, if there is content already set through the existing cleaning history through step S1101, the artificial intelligence cleaner may correct the existing value based on an offset value.

Afterwards, the artificial intelligence cleaner may repeat steps S1101 to S1105 to perform path simplification and cleaning.

Figure 12:
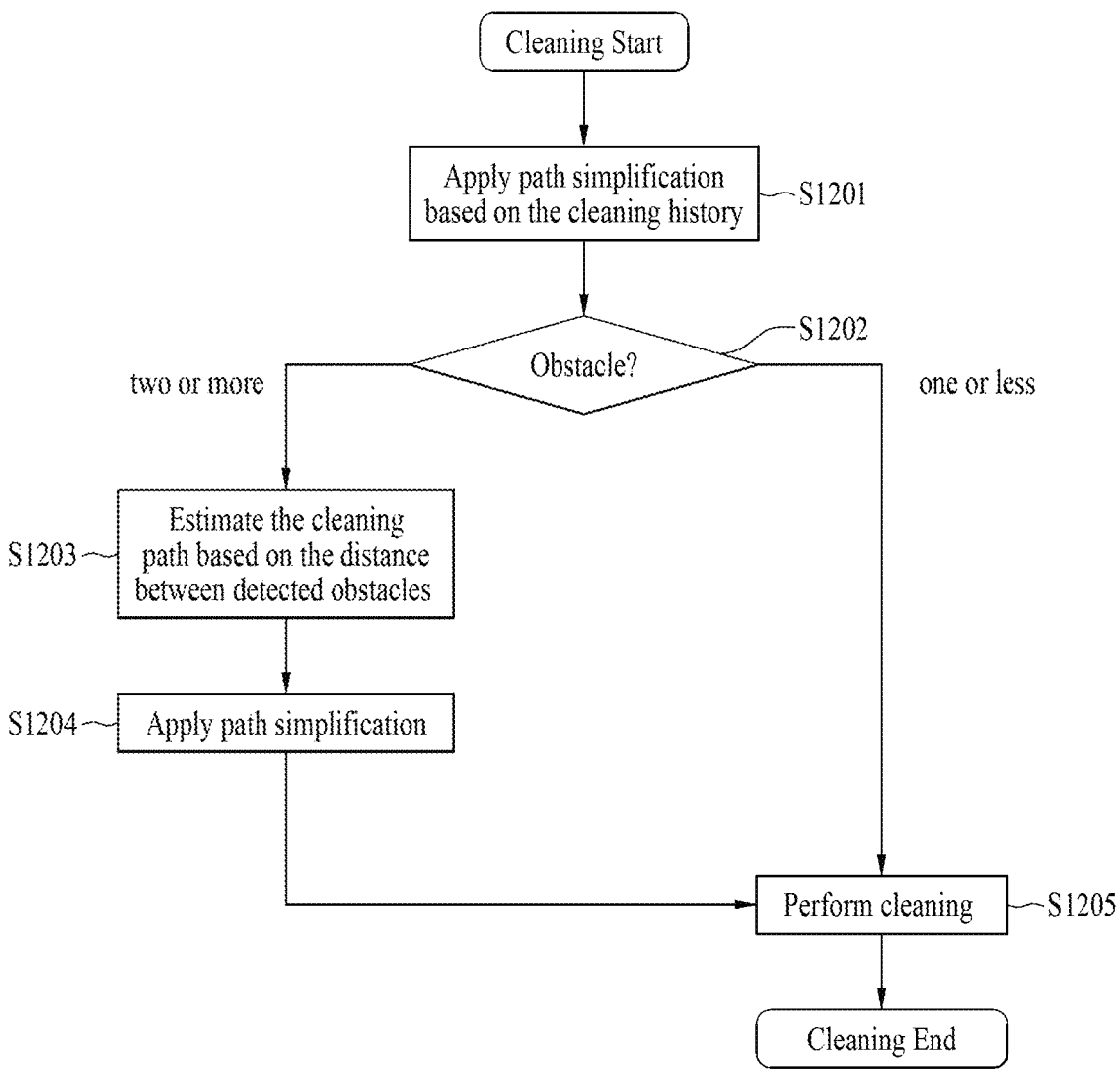
FIG. 12 is a flowchart illustrating a method for operating the artificial intelligence cleaner according to another embodiment of the present disclosure.

FIG. 12 is a flowchart illustrating a method for operating the artificial intelligence cleaner according to another embodiment of the present disclosure.

FIG. 12 explains how the artificial intelligence cleaner determines whether to apply path simplification of the detailed cleaning path depending on external situations.

Referring to FIG. 12, in step S1201, the artificial intelligence cleaner may apply path simplification to the cleaning path based on the cleaning history as can be seen from the above-described embodiment.

At this time, the artificial intelligence cleaner must decide whether to apply path simplification of the detailed cleaning path depending on the external situations (e.g., a situation of obstacle detection or a situation of user mode setting). The situation of obstacle detection will hereinafter be described with reference to the attached drawings. Here, the situation of obstacle detection not only means whether there is an obstacle on the cleaning path, but also means whether the detected obstacle is a doorsill and means whether there is a height difference between the detected obstacles.

In step S1202, when the artificial intelligence cleaner detects the obstacle, the artificial intelligence cleaner may determine the number of detected obstacles.

If the number of detected obstacles is two or more, in step S1203, the artificial intelligence cleaner may estimate the cleaning path based on the distance between the detected obstacles. At this time, the artificial intelligence cleaner may calculate the distance between obstacles detected through embedded sensors (e.g., cameras, radar, etc.), and may estimate the cleaning path based on the calculated distance.

According to one embodiment of the present disclosure, the artificial intelligence cleaner may proceed with cleaning according to step S1205 when the changed cleaning path passes between obstacles. On the other hand, the artificial intelligence cleaner may perform step S1204 if the changed cleaning path does not pass between obstacles.

In step S1204, when the changed cleaning path does not pass between the obstacles, the artificial intelligence cleaner may combine at least two obstacles into one group and then apply path simplification to the combined result.

When path simplification of the cleaning path is performed by grouping obstacles into one group (S1204), the artificial intelligence cleaner may proceed with cleaning (S1205).

On the other hand, if the number of detected obstacles is one or less, in step S1205, the artificial intelligence cleaner may proceed with cleaning based on the existing cleaning path without using path simplification.

In other words, if there are two or more obstacles in the cleaning path, the artificial intelligence cleaner may determine that it is more appropriate to group two or more obstacles into one group and avoid a space between the two or more obstacles, rather than cleaning the space between the two or more obstacles.

In addition, the artificial intelligence cleaner may perform path simplification of the detailed cleaning path according to the user mode setting. For example, when the artificial intelligence cleaner receives a user request such as a quick mode or a simple mode for the cleaning target area, the artificial intelligence cleaner may apply path simplification to the cleaning target area. Accordingly, the artificial intelligence cleaner may proceed with cleaning by modifying or changing the cleaning path.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof.

INDUSTRIAL APPLICABILITY

The embodiments of the artificial intelligence cleaner described above have industrial applicability because they may be repeatedly performed.

The invention claimed is:

1. An artificial intelligence cleaner comprising:
   a memory configured to store a simultaneous localization and mapping (SLAM) map of a cleaning space to be cleaned;
   a travel driver configured to drive the artificial intelligence cleaner; and
   a processor configured to determine a cleaning path of the artificial intelligence cleaner based on the SLAM map, and to control the travel driver according to the determined cleaning path,
   wherein, when an abnormal situation occurs during cleaning based on the determined cleaning path, the processor is configured to modify the cleaning path by applying path simplification to a preset area from among the remaining cleaning areas,
   wherein the processor is configured to:

identify at least one candidate area where path simplification is possible from among the remaining cleaning areas;
determine a priority of the at least one candidate area; and
determine the preset area based on the priority level,
wherein the path simplification is sequentially applied to the candidate areas arranged in ascending priority order such that the path simplification is first applied to a lowest-priority candidate area and is finally applied to a highest-priority candidate area, and
wherein the priority is determined based on the number of vertices compared to a preset area based on the SLAM map.

2. The artificial intelligence cleaner according to claim 1, wherein:
   the processor is configured to predict a cleaning completion time compared to the remaining cleaning areas based on the modified cleaning path.

3. The artificial intelligence cleaner according to claim 2, wherein:
   the processor is configured to predict the cleaning completion time based on a reduced number of wheel rotations, after completion of the path simplification.

4. The artificial intelligence cleaner according to claim 1, wherein:
   the abnormal situation indicates a situation in which a remaining battery lifespan of the artificial intelligence cleaner is considered insufficient,
   wherein
   the processor is configured to calculate an insufficient operable time compared to the remaining cleaning areas based on the remaining battery lifespan.

5. The artificial intelligence cleaner according to claim 1, wherein the processor is configured to:
   input the cleaning path, the SLAM map, and a cleaning history to an area segmentation model trained using a machine learning algorithm or a deep learning algorithm, and thus obtain map data as a result of the input; and
   modify the cleaning path using the obtained map data,
   wherein
   the trained area segmentation model includes an artificial neural network.

6. A method for operating an artificial intelligence cleaner, the method comprising:
   collecting a plurality of cleaning histories for a cleaning space;
   dividing the cleaning space into a plurality of cleaning areas using a simultaneous localization and mapping (SLAM) map of the cleaning space and the plurality of collected cleaning histories;
   determining a cleaning path of the artificial intelligence cleaner in consideration of the divided cleaning areas;
   controlling a travel driver that drives the artificial intelligence cleaner according to the determined cleaning path; and
   when an abnormal situation occurs during cleaning based on the determined cleaning path, modifying the cleaning path by applying path simplification to a preset area from among the remaining cleaning areas,
   wherein the method further comprises:
      identifying at least one candidate area where path simplification is possible from among the remaining cleaning areas;
      determining a priority of the at least one candidate area; and determining the preset area based on the priority level, wherein the path simplification is sequentially applied to the candidate areas arranged in ascending priority order such that the path simplification is first applied to a lowest-priority candidate area and is finally applied to a highest-priority candidate area, and wherein the priority is determined based on the number of vertices compared to a preset area based on the SLAM map.

7. A non-transitory computer readable medium storing computer-executable instructions that when executed by a processor of an artificial intelligence cleaner, cause the processor to perform operations of:

collecting a plurality of cleaning histories for a cleaning space;

dividing the cleaning space into a plurality of cleaning areas using a simultaneous localization and mapping (SLAM) map of the cleaning space and the plurality of collected cleaning histories;

determining a cleaning path of the artificial intelligence cleaner in consideration of the divided cleaning areas;

controlling a travel driver that drives the artificial intelligence cleaner according to the determined cleaning path; and when an abnormal situation occurs during cleaning based on the determined cleaning path, modifying the cleaning path by applying path simplification to a preset area from among the remaining cleaning areas, wherein the operations further include:

identifying at least one candidate area where path simplification is possible from among the remaining cleaning areas;

determining a priority of the at least one candidate area; and determining the preset area based on the priority level, wherein the path simplification is sequentially applied to the candidate areas arranged in ascending priority order such that the path simplification is first applied to a lowest-priority candidate area and is finally applied to a highest-priority candidate area, and wherein the priority is determined based on the number of vertices compared to a preset area based on the SLAM map.

* * * * *